(12) United States Patent
Zhou et al.

(10) Patent No.: US 10,536,079 B2
(45) Date of Patent: Jan. 14, 2020

(54) DC-TO-DC CONVERTERS CAPABLE OF DISCONTINUOUS CONDUCTION MODE, AND ASSOCIATED METHODS

(71) Applicant: Maxim Integrated Products, Inc., San Jose, CA (US)

(72) Inventors: Xin Zhou, Nashua, NH (US); Justin Michael Burkhart, Bolton, MA (US); Michael Warren Baker, Arlington, MA (US); Brett A. Miwa, Wellesley, MA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

(21) Appl. No.: 15/981,058

(22) Filed: May 16, 2018

(65) Prior Publication Data

US 2018/0337602 A1    Nov. 22, 2018

Related U.S. Application Data

(60) Provisional application No. 62/507,066, filed on May 16, 2017.

(51) Int. Cl.
*H02M 3/158* (2006.01)
*H02M 1/36* (2007.01)
*H02M 3/155* (2006.01)
*H02M 1/00* (2006.01)

(52) U.S. Cl.
CPC .......... *H02M 3/1582* (2013.01); *H02M 1/36* (2013.01); *H02M 3/1584* (2013.01); *H02M 2001/0064* (2013.01); *H02M 2003/1552* (2013.01)

(58) Field of Classification Search
CPC .. H02M 3/158; H02M 3/1582; H02M 3/1584; H02M 3/1588; H02M 2003/1586
See application file for complete search history.

(56) References Cited

U.S. PATENT DOCUMENTS

| | | | | | |
|---|---|---|---|---|---|
| 4,713,742 | A | * | 12/1987 | Parsley | H02M 3/158 323/272 |
| 6,784,644 | B2 | * | 8/2004 | Xu | H02M 3/158 323/225 |
| 6,897,641 | B1 | * | 5/2005 | Herbert | H02M 3/1584 323/282 |
| 7,317,305 | B1 | * | 1/2008 | Stratakos | H02M 3/157 323/282 |
| 2011/0133716 | A1 | * | 6/2011 | Cheung | H02M 3/1584 323/285 |

* cited by examiner

*Primary Examiner* — Gary L Laxton
(74) *Attorney, Agent, or Firm* — Lathrop Gage LLP

(57) ABSTRACT

A method for discontinuous conduction mode operation of a multi-phase DC-to-DC converter includes (a) forward biasing a first inductor being magnetically coupled to a second inductor, (b) reverse biasing the first inductor after forward biasing the first inductor, (c) while reverse biasing the first inductor and before magnitude of current through the first inductor falls to zero, forward biasing the second inductor.

20 Claims, 13 Drawing Sheets

DC-TO-DC CONVERTERS CAPABLE OF DISCONTINUOUS CONDUCTION MODE, AND ASSOCIATED METHODS

RELATED APPLICATIONS

The present Application claims benefit of priority to U.S. Provisional Patent Application Ser. No. 62/507,066, filed on May 16, 2017, which is incorporated herein by reference.

BACKGROUND

It is known to electrically couple multiple DC-to-DC sub-converters in parallel to increase DC-to-DC converter capacity and/or to improve DC-to-DC converter performance. One type of DC-to-DC converter with multiple switching sub-converters is a "multi-phase" DC-to-DC converter, where the sub-converters, which are often referred to as "phases," switch out-of-phase with respect to each other in at least some operating modes. Such out-of-phase switching results in ripple current cancellation at the converter output filter and allows the multi-phase DC-to-DC converter to have a better transient response than an otherwise similar single-phase DC-to-DC converter.

A multi-phase DC-to-DC converter's performance can be improved by magnetically coupling the energy storage inductors of two or more phases. Such magnetic coupling results in ripple current cancellation in the inductors and increases ripple switching frequency, thereby improving converter transient response, reducing input and output filtering requirements, and/or improving converter efficiency, relative to an otherwise identical converter without magnetically coupled inductors.

Two or more magnetically coupled inductors are often collectively referred to as a "coupled inductor" and have associated leakage inductance and magnetizing inductance values. Magnetizing inductance is associated with magnetic coupling between windings; thus, the larger the magnetizing inductance, the stronger the magnetic coupling between windings. Leakage inductance, on the other hand, is associated with energy storage. Thus, the larger the leakage inductance, the more energy stored in the inductor. Leakage inductance results from leakage magnetic flux, which is magnetic flux generated by current flowing through one winding of the coupled inductor that is not coupled to the other windings of the inductor.

A DC-to-DC converter including one or more inductors may operate in a continuous conduction mode (CCM) or in a discontinuous conduction mode (DCM). CCM is characterized by current through the one or more inductors continuously flowing, such that the current is always greater than zero. DCM, in contrast, is characterized by current through the one or more inductors remaining at zero for a portion of each switching period. CCM promotes fast transient response and high heavy-load efficiency. Consequently, DC-to-DC converters are commonly designed to operate in CCM at heavy loads. However, CCM can be relatively inefficient at light loads. Therefore, many DC-to-DC converters are designed operate in DCM under light loads.

DETAILED DESCRIPTION OF THE EMBODIMENTS

While there are significant benefits to using coupled inductors in multi-phase DC-to-DC converters, it is difficult to obtain high efficiency under light-load conditions using conventional techniques. In particular, Applicant has determined that the ratio of transferred power to magnetic core losses is typically low during DCM, resulting in low efficiency. Accordingly, Applicant has developed DC-to-DC converters with coupled inductors that are capable of transferring more power during DCM than conventional DC-to-DC converters, thereby promoting high efficiency under light-load conditions.

Figure 1:
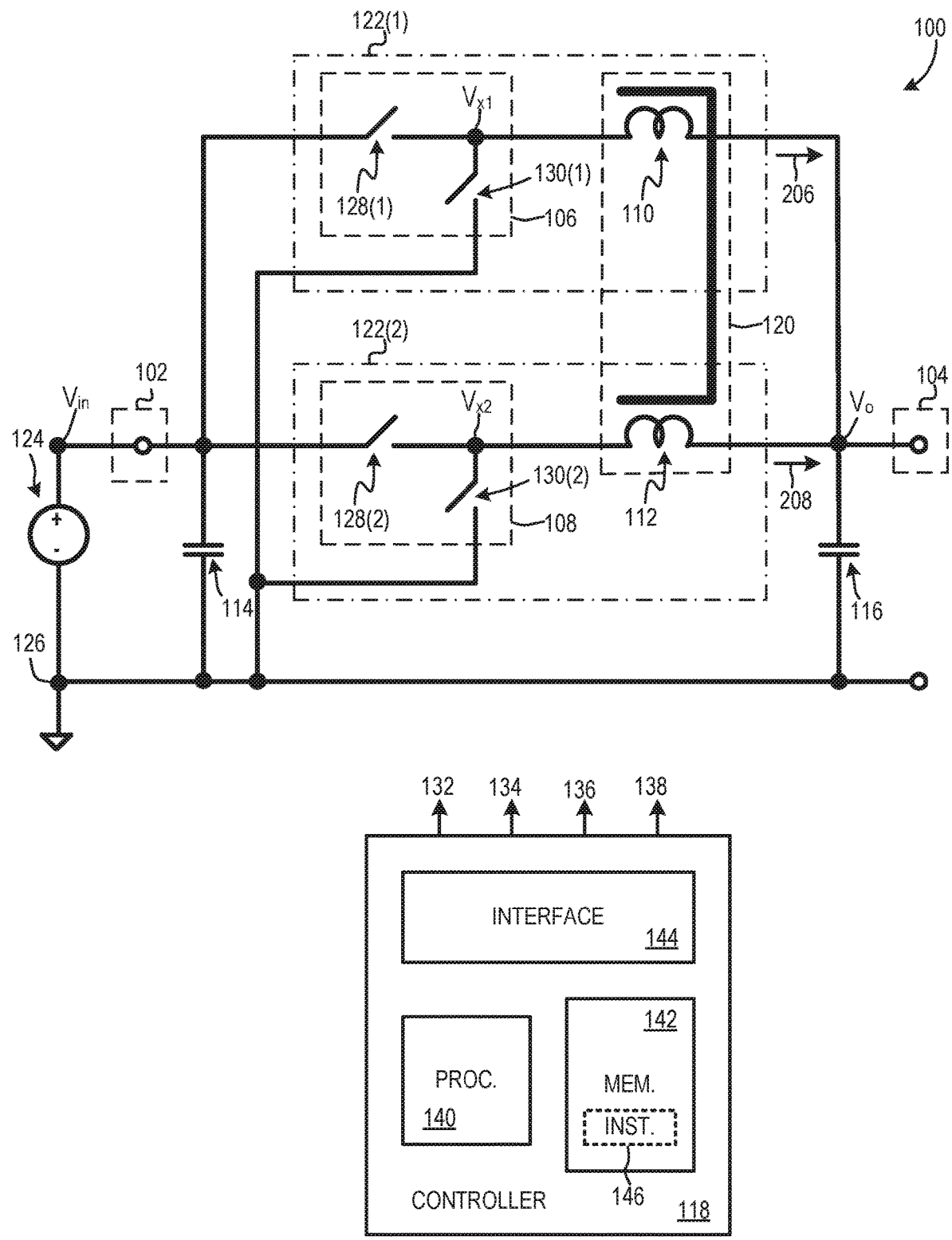
FIG. 1 illustrates a two-phase DC-to-DC converter capable of DCM and including a coupled inductor, according to an embodiment.

For example, FIG. 1 illustrates a two-phase DC-to-DC converter 100 having a buck topology and capable of DCM. DC-to-DC converter 100 includes an input port 102, an output port 104, a first switching circuit 106, a second switching circuit 108, a first inductor 110, a second inductor 112, an input capacitor 114, an output capacitor 116, and a controller 118. First inductor 110 is magnetically coupled to second inductor 112 to collectively form a coupled inductor 120, where each inductor 110, 112 has a respective leakage inductance. Coupled inductor 120 also has a magnetizing inductance associated with magnetic coupling of first and second inductors 110, 112. First inductor 110 is electrically connected between a first switching node $V_{x1}$ and a common output node $V_o$, and second inductor 112 is electrically connected between a second switching node $V_{x2}$ and common output node $V_o$. Current through each of first inductor 110 and second inductor 112 is summed at common output node $V_o$, and output capacitor 116 capacitively filters common output node $V_o$.

First switching circuit 106 is electrically connected to first switching node $V_{x1}$, and second switching circuit 108 is electrically connected to second switching node $V_{x2}$. Each switching circuit 106 and 108 is electrically connected to input port 102, which is in turn electrically connected to an input node $V_{in}$. An electric power source 124 is electrically connected between input node $V_{in}$ and a reference node 126. Output port 104 is electrically connected to output node $V_o$. Input capacitor 114 is electrically connected between input node $V_{in}$ and reference node 126, and output capacitor 116 is electrically connected between output node $V_o$ and reference node 126. Each switching circuit 106, 108 and its respective inductor 110, 112 are collectively referred to as a "phase" 122 of the converter. Thus, DC-to-DC converter 100 has two phases. In this document, specific instances of an item may be referred to by use of a numeral in parentheses (e.g., phase 122(1)) while numerals without parentheses refer to any such item (e.g., phases 122).

Each switching circuit 106, 108 includes a control switching device 128 that alternately switches between its conductive and non-conductive states under the command of controller 118. Switching devices 128 are considered "control" switching devices because magnitude of converter output voltage, i.e. voltage at output port 104, is a function of duty cycle of switching devices 128. Each switching circuit 106, 108 further includes a freewheeling switching device 130 adapted to provide a path for current through its respective inductor 110, 112 when the control switching device 128 of the switching circuit transitions from its conductive to non-conductive state. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

Controller 118 causes each switching circuit 106, 108 to repeatedly switch its respective inductor 110, 112 between input node $V_{in}$ and reference node 126, thereby repeatedly forward biasing and reverse biasing its respective inductor, to transfer power from electric power source 124 to a load (not shown) electrically connected to output port 104. In this document, an inductor is "forward biased" when the inductor's respective control switching device is operating in its conductive state and the inductor's respective freewheeling switching device is operating in its non-conductive state. For example, inductor 110 is forward biased when control switching device 128(1) is operating in its conductive state and freewheeling switching device 130(1) is operating in its non-conductive state. Conversely, an inductor is "reversed biased" in this document when the inductor's respective control switching device is operating in its non-conductive state and when the inductor's respective freewheeling switching device is operating in its conductive state. For example, inductor 110 is reverse biased when control switching device 128(1) is operating in its non-conductive state and freewheeling switching device 130(1) is operating in its conductive state. Additionally, each switching circuit 106, 108 is capable of operating in a high impedance state, and thereby electrically isolating its respective inductor, by operating each of its control switching device 128 and its freewheeling switching device 130 in their non-conductive states. For example, inductor 110 is electrically isolated when both of control switching device 128(1) and freewheeling switching device 130(1) are operating in their respective non-conductive states.

Controller 118 generates signals 132, 134, 136, 138 to control switching devices 128(1), 130(1), 128(2), 130(2), respectively. When a signal 132, 134, 136, 138 is asserted, its respective switching device 128(1), 130(1), 128(2), 132 (2) is in its conductive state. Conversely, when a signal 132, 134, 136, 138 is de-asserted, its respective switching device 128(1), 130(1), 128(2), 132(2) is in its non-conductive state. Connections between signals 132, 134, 136, 138 and their respective switching devices are not shown in FIG. 1 to promote illustrative clarity. Controller 118 is optionally configured to control switching circuits 106, 108 to regulate one or more parameters of two-phase DC-to-DC converter 100, such voltage at output port 104 and/or current through output port 104.

Controller 118 typically causes switching circuits 106, 108 to switch at a relatively high frequency, optionally at 100 kilohertz or greater, to promote low ripple current magnitude and fast transient response, as well as to ensure that switching induced noise is at a frequency above that perceivable by humans. Additionally, in certain embodiments, controller 118 causes switching circuits 106, 108 to switch out-of-phase with respect to each other in CCM.

Controller 118 includes a processor 140, a memory 142, and interface circuitry 144. Processor 140 executes instructions 146, in the form of firmware or software stored in memory 142, to control DC-to-DC converter 100, such as to control switching circuits 106, 108. Interface circuitry 144 electrically interfaces processor 140 with other circuitry, such as switching circuits 106, 108. For example, in some embodiments, interface circuitry 144 includes level shifting circuitry for converting signals from processor 140 to signals 132, 134, 136, 138 in a form suitable for driving control switching devices 128 and freewheeling switching devices 130. In certain embodiments, controller 118 is partially or fully implemented as an integrated circuit, optionally further including switching circuits 106, 108. In some alternate embodiments, processor 140 and memory 142 are replaced with, or supplemented by, analog and/or digital electronic circuitry.

Figure 2:
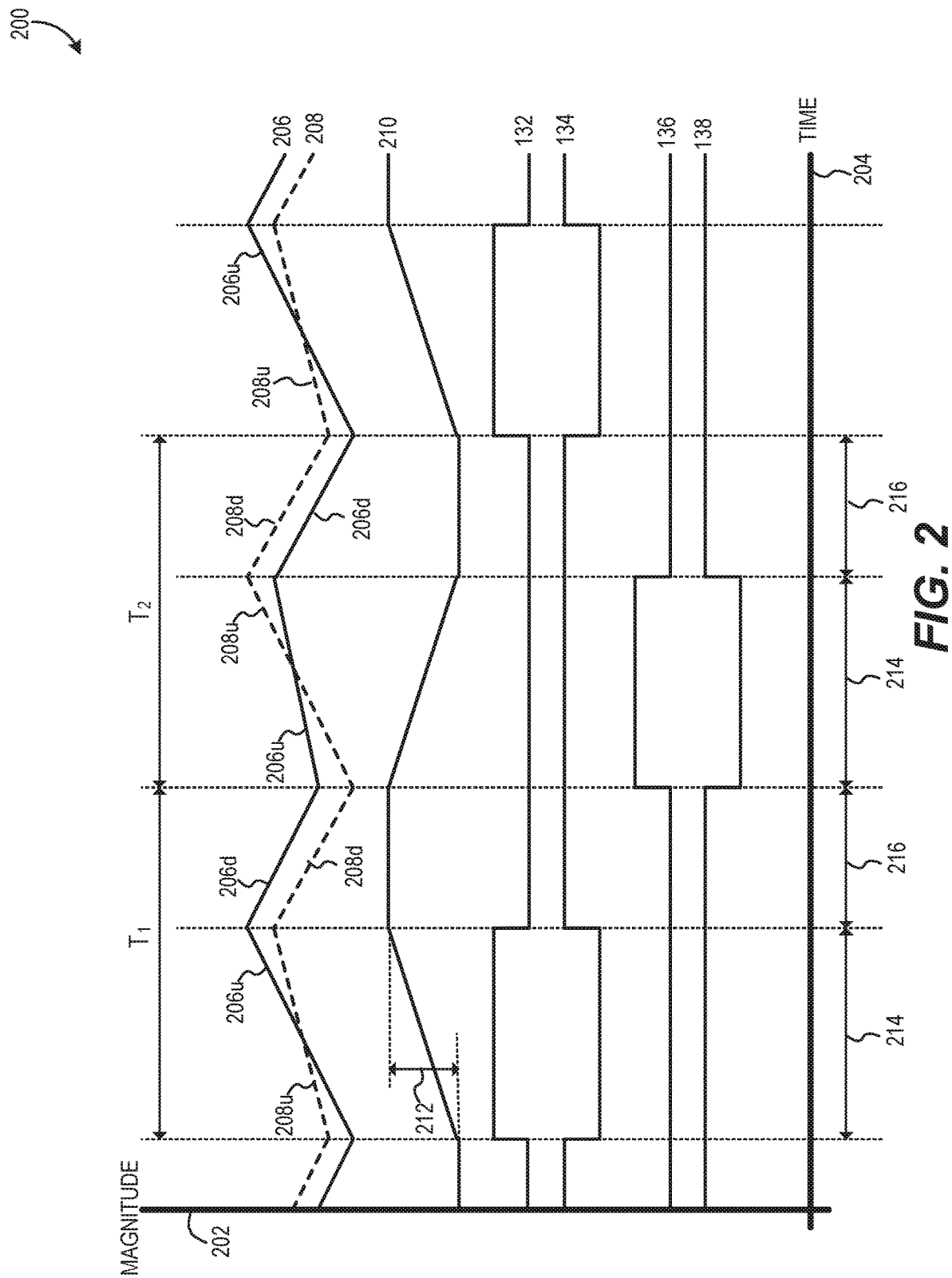
FIG. 2 illustrates CCM of the FIG. 1 DC-to-DC converter.

Controller 118 is configured to operate DC-to-DC converter 100 in at least two modes, i.e., CCM and DCM. FIG. 2 is a graph 200 illustrating operation in CCM. Vertical axis 202 represents magnitude, and horizontal axis 204 represents time. Graph 200 includes curves representing current 206 through leakage inductance of first inductor 110, current 208 through leakage inductance of second inductor 112, magnetizing current 210 of coupled inductor 120, and switching device signals 132, 134, 136, 138. In this example, each of signals 132, 134, 136, 138 is asserted when it is in its logic-high state. However, controller 118 could alternately be configured such that each of signals 132, 134, 136, 138 is asserted when it is in its logic-low state. Controller 118 controls first switching circuit 106 and second switching circuit 108 as follows. During a first sub-period 214 of switching period $T_1$, first switching circuit 106 forward biases first inductor 110, and second switching circuit 108 reverse biases second inductor 112, such that current 206 through first inductor 110 ramps up and magnetically induces current through second inductor 112. In this document, "ramps up" means to increase in value over time, such that an ending value is greater than a beginning value. For example, in each first sub-period 214, the value of current 206 at the end up of the sub-period is greater than the value of current 206 at the beginning of the sub-period. Line segments representing current 206 and 208 ramping up are designated as 206u and 208u, respectively, in FIG. 2. During a second sub-period 216 of period $T_1$, first switching circuit 106 reverse biases first inductor 110, and second switching circuit 108 reverse biases second inductor 112, such that current through each inductor ramps down. In this document, "ramps down" means to decrease in value over time, such that an ending value is smaller than a beginning value. For example, in each second sub-period 216, the value of current 206 at the end up of the sub-period is smaller than the value of current 206 at the beginning of the sub-period. Line segments representing current 206 and 208 ramping down are designated as 206d and 208d, respectively, in FIG. 2. In first sub-period 214 of period $T_2$, second inductor 112 is forward biased in place of first inductor 110, and first inductor 110 is reverse biased in place of second inductor 112. Periods $T_1$ and $T_2$ repeat in an alternating manner. Magnetizing current 210 has a peak-to-peak magnitude 212, and currents 206 and 208 have differing magnitudes in each period T due to imperfect magnetic coupling of first and second inductors 110, 112.

Figure 3:
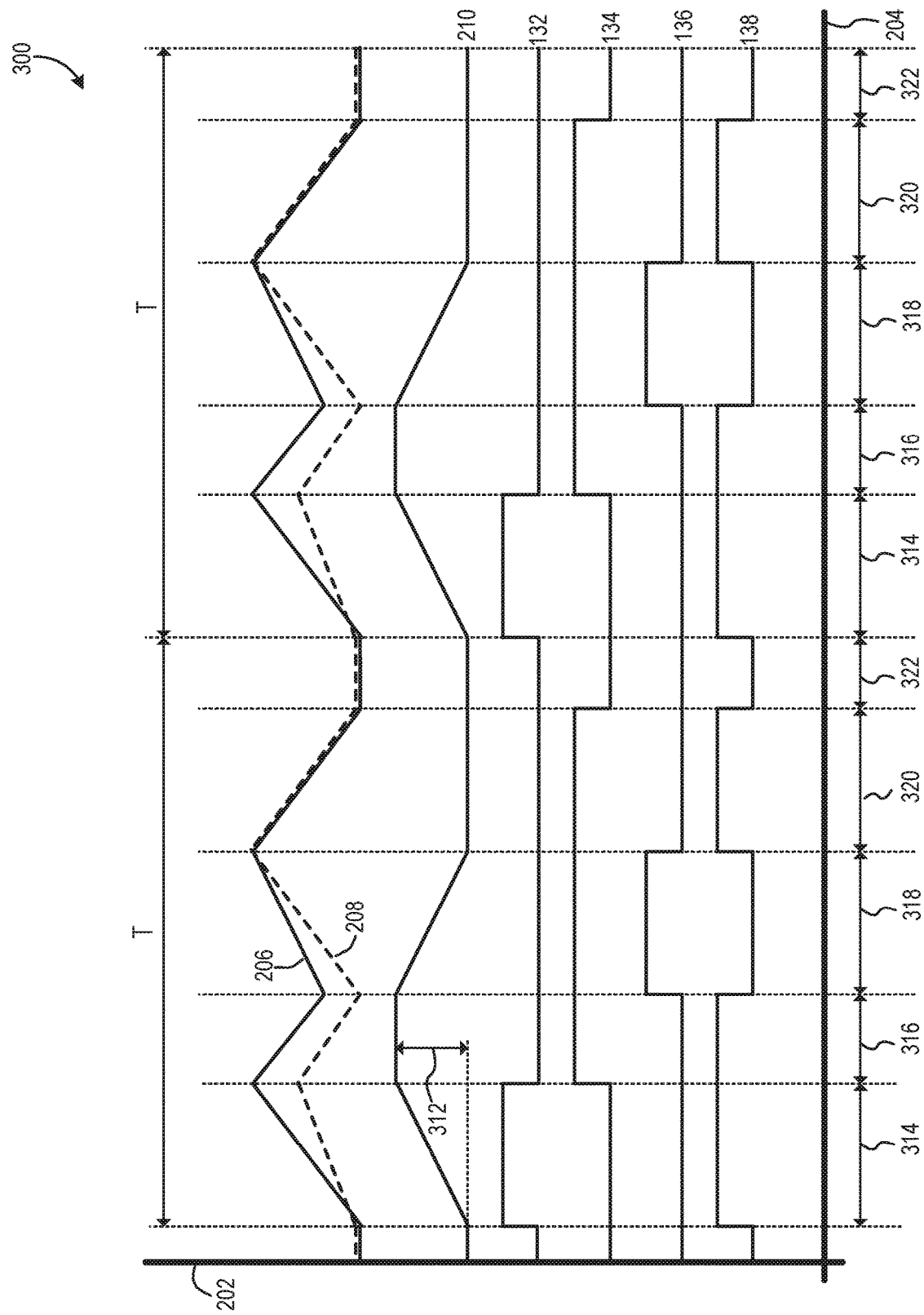
FIG. 3 illustrates DCM of the FIG. 2 DC-to-DC converter.

FIG. 3 is a graph 300 like graph 200 of FIG. 2, but illustrating operation of DC-to-DC converter 100 in DCM instead of in CCM. Controller 118 controls first switching circuit 106 and second switching circuit 108 as follows in DCM. During a first sub-period 314 of period T, first switching circuit 106 forward biases first inductor 110, and second switching circuit 108 reverse biases second inductor 112, such that current 206 through first inductor 110 ramps up and magnetically induces current through second inductor 112. Thus, controller 118 causes an energy transfer pulse, i.e., forward biasing of first inductor 110, to occur in first sub-period 314. First switching circuit 106 then reverse biases first inductor 110, and second switching circuit 108 reverse biases second inductor 112, in a second sub-period 316 of period T. Consequently, current 206 through first inductor 110 and current 208 through second inductor 112 ramp down during second sub-period 316.

Importantly, and in contrast to conventional DCM techniques, controller 118 causes an additional energy transfer pulse to occur in each DCM switching period T. In particular, in response to magnitude of current 208 through second inductor 112 falling to zero, second switching circuit 108 forward biases second inductor 112 in a third sub-period 318 of period T, such that magnitude of current 208 through second inductor 112 ramps up and magnetically induces current through first inductor 110. Thus, first inductor 110 and second inductor 112 are forward biased non-simultaneously during each DCM switching period T, i.e., during first sub-period 314 and third sub-period 318, respectively. As discussed below, the extra energy transfer pulse during each DCM switching period T, i.e., forwarding biasing of second inductor 112 in third sub-period 318, increases the ratio of transferred power to magnetic core losses, thereby promoting high efficiency at light load.

First switching circuit 106 reverse biases first inductor 110, and second switching circuit 108 reverse biases second inductor 112, in a fourth sub-period 320 of period T, such that current 206 through first inductor 110 and current 208 through second inductor 112 ramp down during fourth sub-period 320. In a fifth sub-period 322 of period T, each of first switching circuit 106 and second switching circuit 108 operates in a high-impedance state to electrically isolate its respective inductor 110, 112, such that magnitude of current 206 through first inductor 110 and magnitude of current 208 through second inductor 112 each remain at zero for the duration of fifth sub-period 322. Magnetizing current 210 has a peak-to-peak magnitude 312 during DCM in DC-to-DC converter 100.

Figure 4:
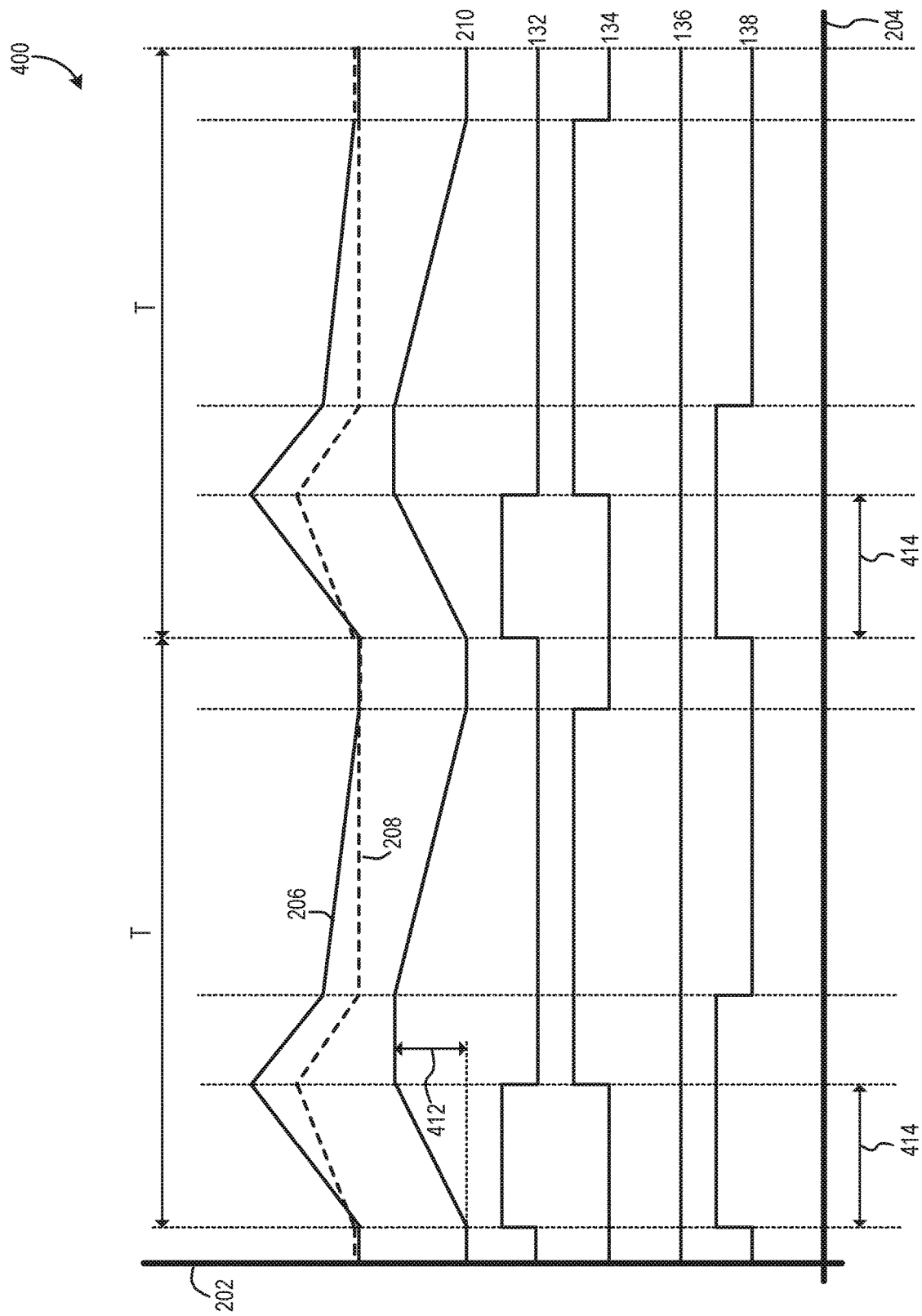
FIG. 4 illustrates DCM of a two-phase DC-to-DC converter with only one energy transfer pulse per period.

To help appreciate how the additional energy transfer pulse during DCM in DC-to-DC converter 100 helps achieve high efficiency, consider FIG. 4, which includes a graph 400 like graph 300 of FIG. 3, but with DC-to-DC converter 100 modified so that only a single energy transfer pulse occurs in each period. Energy is transferred from electric power source 124 to a load connected to output port 104 only once during each period T, i.e., during a first sub-period 414. However, peak-to-peak magnetizing current 412 is similar to peak-to-peak magnetizing current 212 of CCM (and peak-to-peak magnetizing current 312 of DCM in FIG. 3), and magnetic core losses increase with increasing peak-to-peak magnetizing current. Consequently, the ratio of transferred power to magnetic core losses is relatively low in the FIG. 4 modified configuration. In DCM as illustrated in FIG. 3 in contrast, energy is transferred from electric power source 124 to a load connected to output port 104 twice during each period T, i.e., during first sub-period 314 and during third sub-period 318. Additionally, peak-to-peak magnetizing current 312 is about the same as peak magnetizing current 412 of FIG. 4. Consequently, DC-to-DC converter 100 will have a much larger ratio of transferred power to magnetic core losses than the FIG. 4 modified configuration, and DC-to-DC converter 100 will therefore have a significantly higher efficiency during DCM than the FIG. 4 modified configuration.

Figure 5:
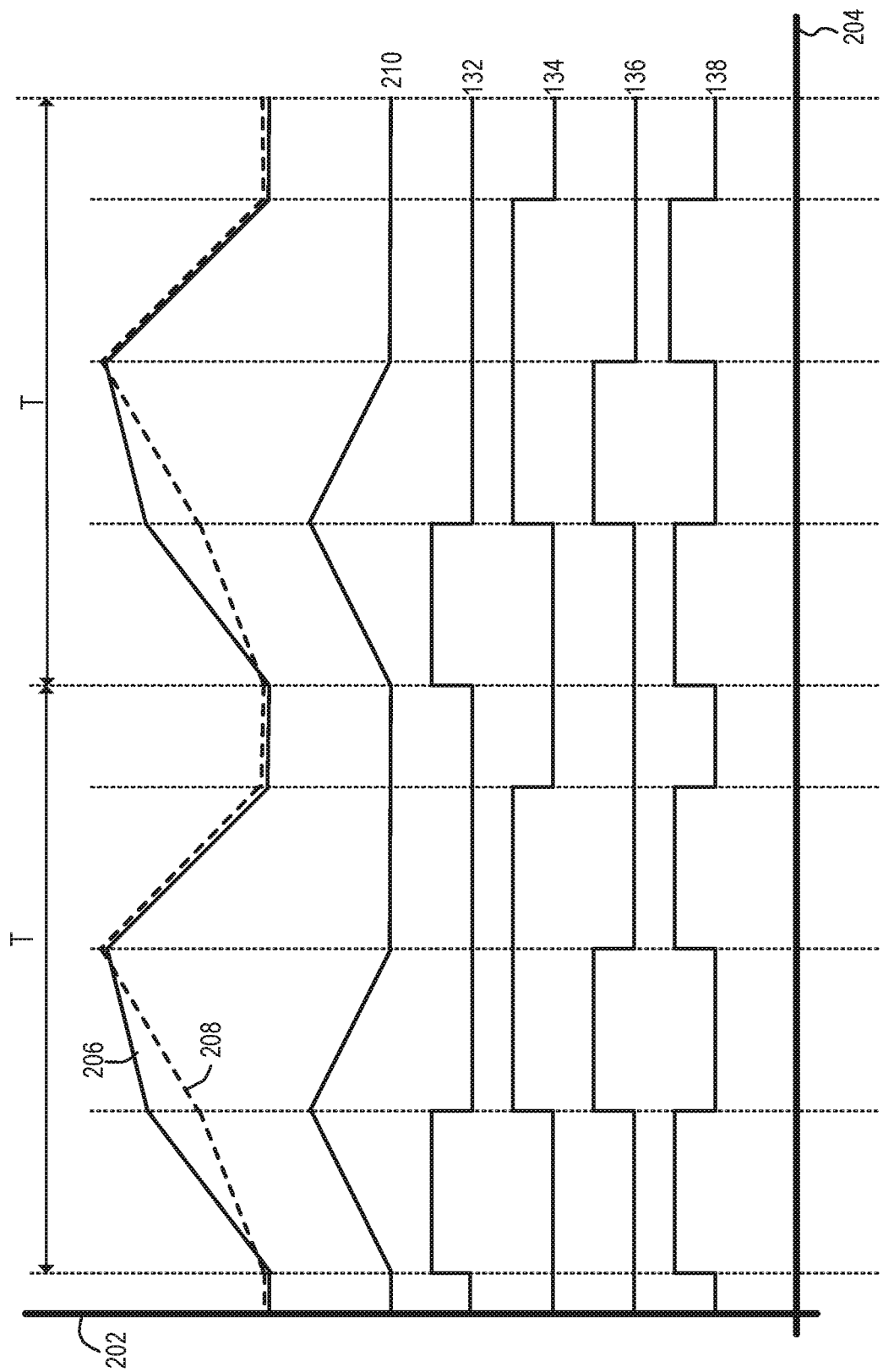
FIG. 5 illustrates DCM of an alternate embodiment of the FIG. 1 DC-to-DC converter.

DC-to-DC converter 100 can be modified to have a different switching pattern in DCM as long as second inductor 112 is forward biased during each period T while current is still flowing through at least one of first inductor 110 and second inductor 112 after reverse biasing first inductor 110. For example, FIG. 5 illustrates DCM of an alternate embodiment of DC-to-DC converter 100 where controller 118 causes second switching circuit 108 to forward bias second inductor 112 in response to first switching circuit 106 reverse biasing first inductor 110, instead of in response to current 208 through second inductor 112 falling to zero. The FIG. 5 alternate embodiment will have a higher ratio of transferred power to magnetic core losses than the FIG. 1 embodiment, but the FIG. 5 alternate embodiment will have a larger ripple current magnitude than the FIG. 1 embodiment.

Figure 6:
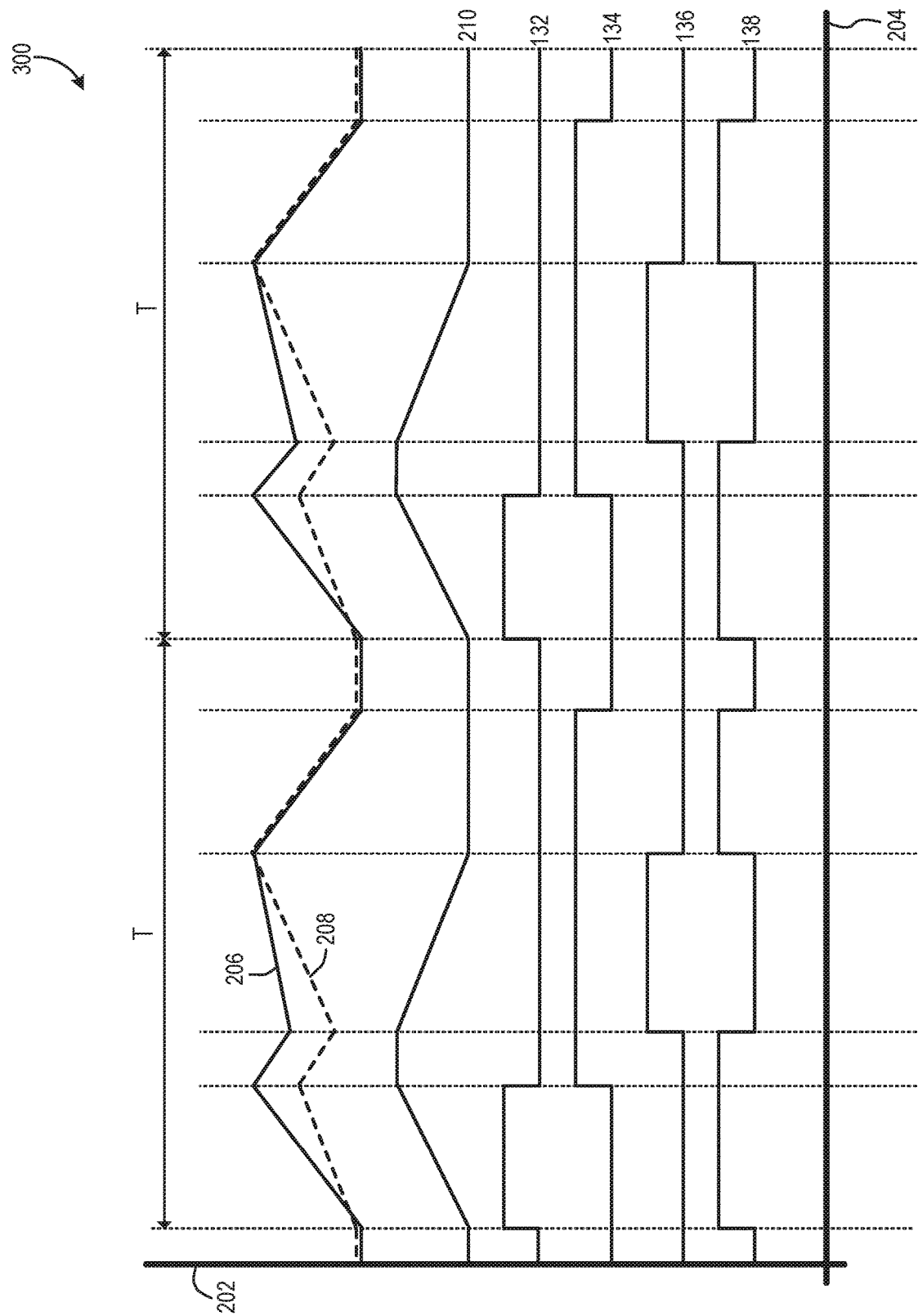
FIG. 6 illustrates DCM of another alternate embodiment of the FIG. 1 DC-to-DC converter.

In some other alternate embodiments of DC-to-DC converter 100, second inductor 112 is forward biased in DCM at a time other than when first inductor 110 is reverse biased or when current 208 through second inductor 112 falls to zero, such as to optimize efficiency for particular operating conditions and/or DC-to-DC converter characteristics. For example, FIG. 6 illustrates DCM of an alternate embodiment of DC-to-DC converter 100 where controller 118 causes second switching circuit 108 to forward bias second inductor 112 at time t, where time t occurs after first switching circuit 106 reverse biases first inductor 110 but before current 208 through second inductor 112 falls to zero.

Figure 7:
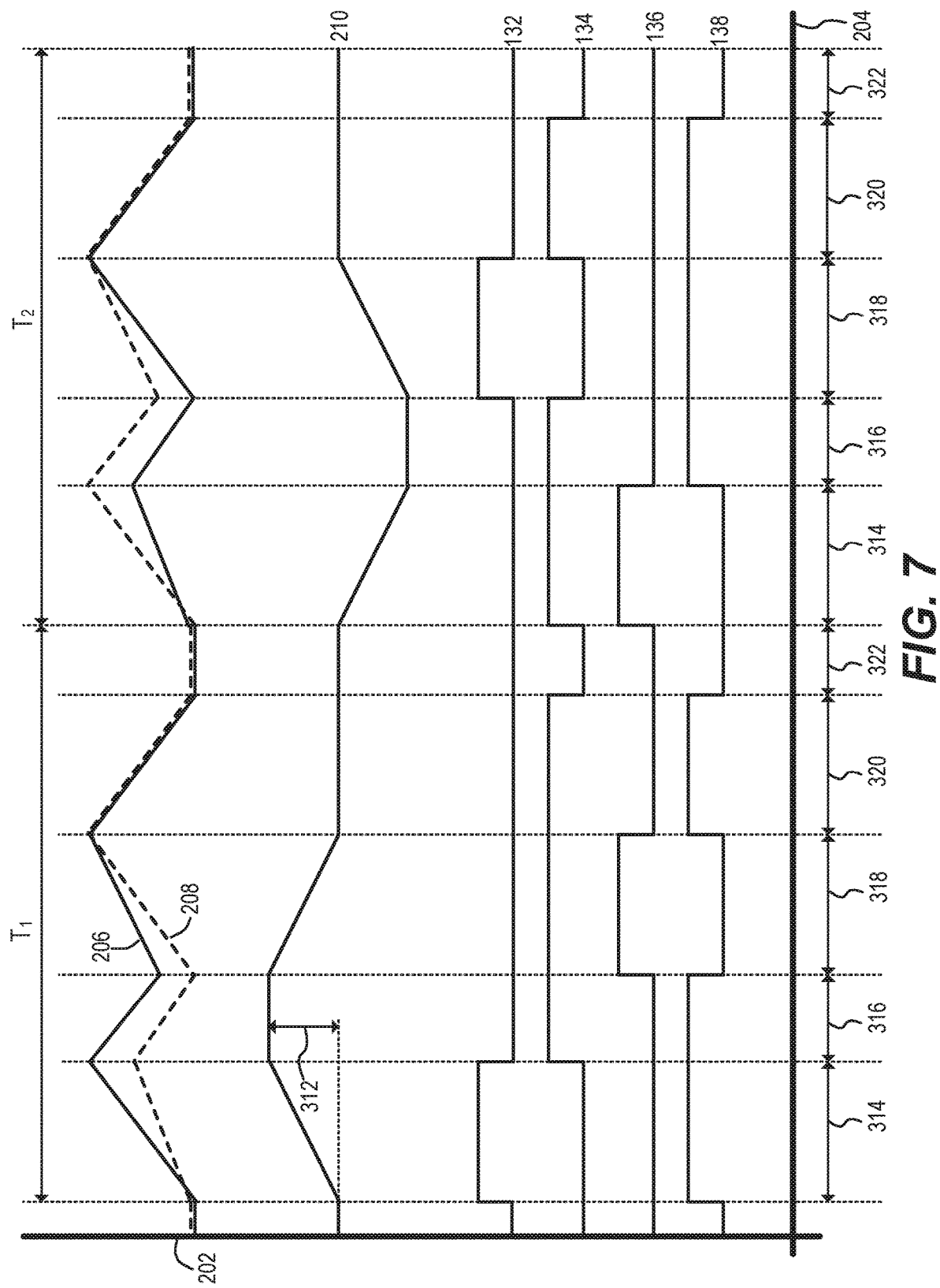
FIG. 7 illustrates DCM of yet another alternate embodiment of the FIG. 1 DC-to-DC converter.

Each period T has the same switching pattern during DCM in DC-to-DC converter 100. However, DC-to-DC converter 100 can be modified to alternate forward biasing of inductors from one period T to the next. For example, FIG. 7 illustrates DCM of an alternate embodiment of DC-to-DC converter 100 where a first period $T_1$ has a switching pattern like that illustrated in FIG. 3, but where a second period $T_2$ has a switching pattern as follows. During a first sub-period 314 of period $T_2$, second switching circuit 108 forward biases second inductor 112, and first switching circuit 106 reverse biases first inductor 110, such that current 208 through second inductor 112 ramps up and magnetically induces current through first inductor 110. Second switching circuit 108 then reverse biases second inductor 112, and first switching circuit 106 reverse biases first inductor 110, in a second sub-period 316 of period $T_2$. Consequently, current 206 through first inductor 110 and current 208 through second inductor 112 ramp down during second sub-period 316. In response to magnitude of current 206 through first inductor 110 falling to zero, first switching circuit 106 forward biases first inductor 110 in a third sub-period 318 of period $T_2$, such that magnitude of current 206 through first inductor 110 ramps up and magnetically induces current through second inductor 112.

First switching circuit 106 reverse biases first inductor 110, and second switching circuit 108 reverse biases second inductor 112, in a fourth sub-period 320 of period $T_2$, such that current 206 through first inductor 110 and current 208 through second inductor 112 ramp down during fourth sub-period 320. In a fifth sub-period 322 of period $T_2$, each of first switching circuit 106 and second switching circuit 108 operates in a high-impedance state to electrically isolate its respective inductor 110, 112, such that magnitude of current 206 through first inductor 110 and magnitude of current 208 through second inductor 112 remain at zero for the duration of fifth sub-period 322. Periods $T_1$ and $T_2$ repeat in an alternating manner such that the respective roles of first and second inductors 110 and 112 alternate between successive switching periods. Accordingly, in this embodiment, controller 118 can be considered to designate one of inductors 110 and 112 as the "first" inductor in each switching period and change which inductor is designated as the "first" inductor between successive switching periods. The alternate embodiments of FIGS. 5 and 6 could also be modified to alternate forward biasing of inductors from one period T to the next.

Figure 8:
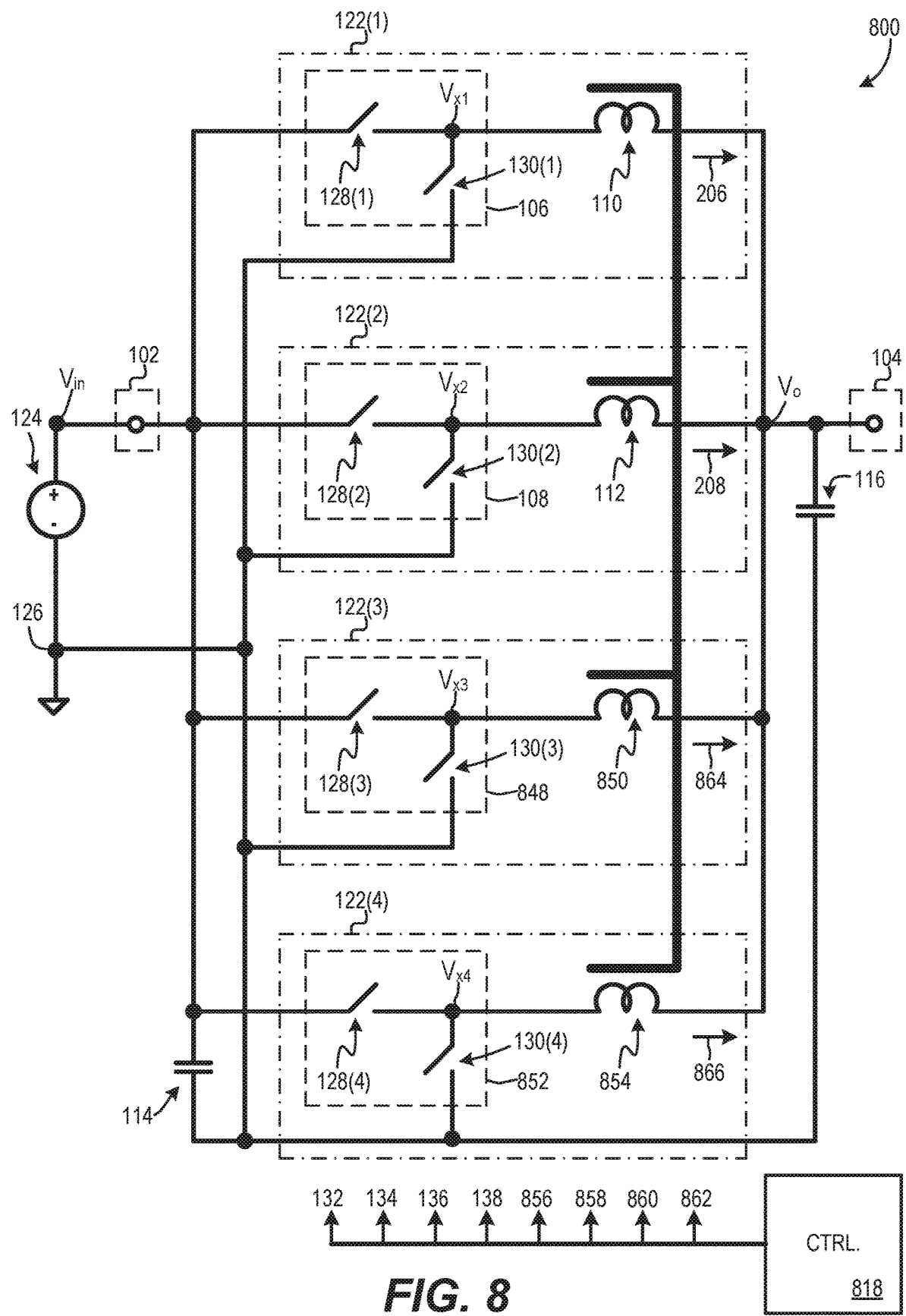
FIG. 8 illustrates a four-phase DC-to-DC converter capable of DCM and including a coupled inductor, according to an embodiment.

The concept of including more than one energy transfer pulse in each DCM switching period can be extended to DC-to-DC converters with more than two phases. For example, FIG. 8 illustrates a DC-to-DC converter 800 which is similar to DC-to-DC converter 100 of FIG. 1, but includes two additional phases 122(3) and 122(4). Phase 122(3) includes a third switching circuit 848 electrically connected between input port 102 and a third switching node $V_{x3}$, as well as a third inductor 850 electrically connected between third switching node $V_{x3}$ and common output node $V_o$. Phase 122(4) includes a fourth switching circuit 852 electrically connected between input port 102 and a fourth switching node $V_{x4}$, as well as a fourth inductor 854 electrically connected between fourth switching node $V_{x4}$ and common output node $V_o$. Each of first inductor 110, second inductor 112, third inductor 850, and fourth inductor 854 are magnetically coupled to each other to achieve mutual magnetic coupling. In this document, the term "mutual magnetic coupling" means that each inductor is magnetically coupled to each other inductor. Accordingly, each inductor 110, 112, 850, 854 includes a respective leakage inductance, and there is a respective magnetizing inductance associated with magnetic coupling of each pair of inductors 110, 112, 850, 854. Third switching circuit 848 includes a control switching device 128(3) and a freewheeling switching device 130(3), and fourth switching circuit 852 includes a control switching device 128(4) and a freewheeling switching device 130(4). A controller 818 generates signals 132, 134, 136, 138, 856, 858, 860, 862 to control switching devices 128(1), 130(1), 128(2), 132(2), 128(3), 130(3), 128(4), 130(4), respectively.

Figure 9:
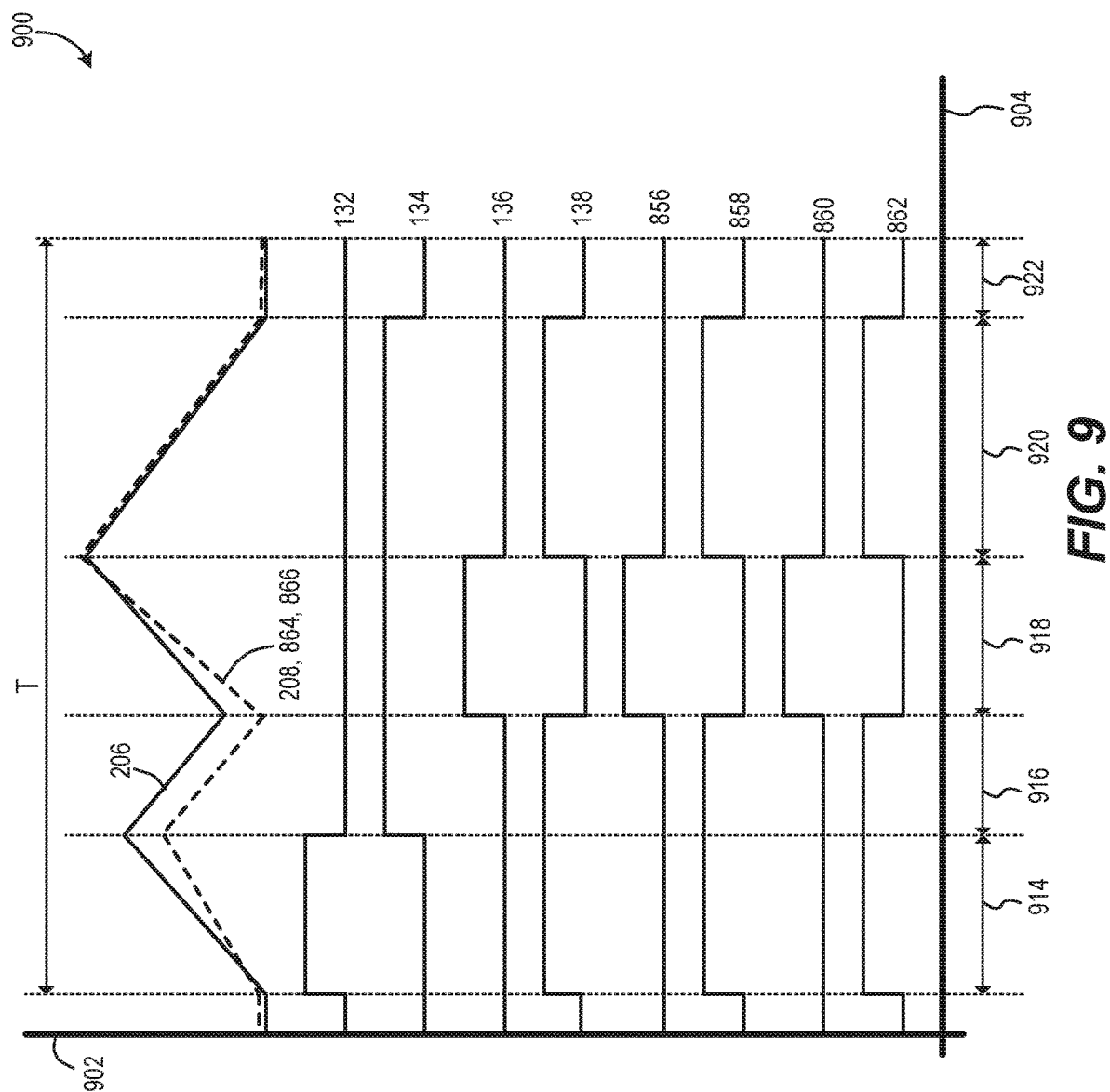
FIG. 9 illustrates DCM of the FIG. 8 DC-to-DC converter.

Controller 818 is similar to controller 118 of FIG. 1, and controller 818 is configured to control each of first switching circuit 106, second switching circuit 108, third switching circuit 848, and fourth switching circuit 852 in DCM, as described below and as illustrated in FIG. 9. FIG. 9 includes a graph 900 illustrating operation of DC-to-DC converter 800 during DCM, where vertical axis 902 represents magnitude and horizontal axis 904 represents time. Graph 900 includes curves representing current 206 through leakage inductance of first inductor 110, current 208 through leakage inductance of second inductor 112, current 864 through leakage inductance of third inductor 850, current 866 through leakage inductance of fourth inductor 854, and switching device signals 132, 134, 136, 138, 856, 858, 860, 862. The curves representing current 208 through leakage inductance of second inductor 112, current 864 through leakage inductance of third inductor 850, and current 866 through leakage inductance of fourth inductor 854 are essentially the same and are therefore represented by a single dashed line in FIG. 9 to promote illustrative clarity.

During a first sub-period 914 of period T, first switching circuit 106 forward biases first inductor 110, and second, third, and fourth switching circuits 108, 848, and 852 reverse bias second inductor 112, third inductor 850, and fourth inductor 854, respectively, such that current 206 through first inductor 110 ramps up and magnetically induces current through each of second, third, and fourth inductors 112, 850, 854. Each switching circuit 106, 108, 848, 852 reverse biases it respective inductor 110, 112, 850, 854 in a second sub-period 916 of period T, such that current through each inductor ramps down.

In response to magnitude of current through at least one of second inductor 112, third inductor 850, or fourth inductor 854 falling to zero, each of second switching circuit 108, third switching circuit 848, and fourth switching circuit 852 forward biases its respective inductor 112, 850, 854, in a third sub-period 918 of period T. As a result, magnitude of current through second inductor 112, third inductor 850, and fourth inductor 854 ramps up and magnetically induces current through first inductor 110. Thus, first inductor 110 and second inductor 112 are forward biased non-simultaneously during each DCM switching period T. Additionally, first inductor 110 and third inductor 850 are forward biased non-simultaneously during each DCM switching period T, and first inductor 110 and fourth inductor 854 are also forward biased non-simultaneously during each DCM switching period T. Each switching circuit 106, 108, 848, 852 then reverse biases it respective inductor 110, 112, 850, 854 in a fourth sub-period 920 of period T, such that current through each inductor ramps down. In a fifth sub-period 922 of period T, each switching circuit 106, 108, 848, 852 operates in a high-impedance state to electrically isolate its respective inductor 110, 114, 850, 854, such that magnitude of current through each inductor remains at zero for the duration of fifth sub-period 922.

Controller 818 is further configured in DC-to-DC converter 800 to alternate forwarding biasing of inductors 110, 112, 850, 854 from one period to the next. For example, second inductor 112 may be forward biased during first sub-period 914 in a period T immediately after the period T illustrated in FIG. 9. Accordingly, in this embodiment, controller 818 can be considered to designate one of inductors 110, 112, 850, and 854 as the "first" inductor in each switching period and change which inductor is designated as the "first" inductor between successive switching periods.

Figure 10:
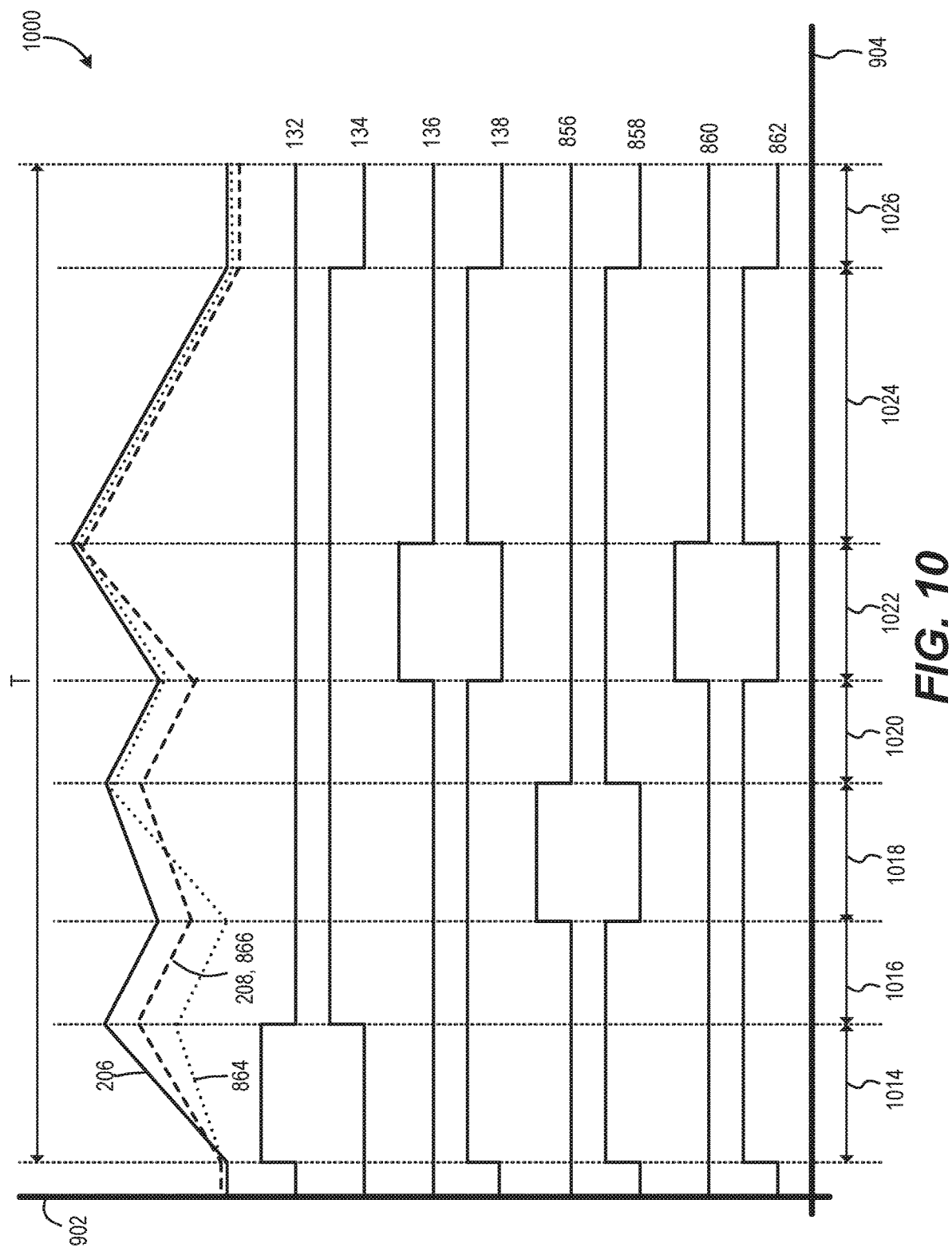
FIG. 10 illustrates DCM of an alternate embodiment of the FIG. 8 DC-to-DC converter.
Figure 11:
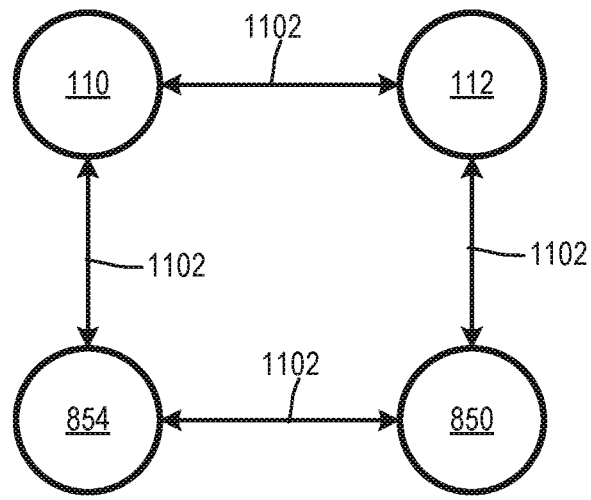
FIG. 11 illustrates magnetic coupling of the alternate embodiment of the FIG. 10.

Controller 818 could be modified so that it causes third sub-period 918 to begin at a different time than that illustrated in FIG. 9, as long as third sub-period 918 begins while current is still flowing through at least one of inductors 110, 112, 850, and 854 after reverse biasing first inductor 110. Additionally, the switching patterns, as well as magnetic coupling of inductors 110, 112, 850, 854, may be varied without departing from the scope hereof, as long as at least two energy transfer pulses occur in each period during DCM. For example, FIG. 10 includes a graph 1000 like graph 900 of FIG. 9 but illustrating DCM of an alternate embodiment of DC-to-DC converter 800 with different magnetic coupling of inductors 110, 112, 850, 854. In particular, inductors 110, 112, 850, 854 have a "neighbor" magnetic coupling configuration, as symbolically illustrated in FIG. 11 where arrows 1102 represent strong magnetic coupling, in the FIG. 10 alternate embodiment. For example, although inductors 110, 112, 850, and 854 are all magnetically coupled, third inductor 850 is more strongly magnetically coupled to each of second inductor 112 and fourth inductor 854 than to first inductor 110. As another example, fourth inductor 854 is more strongly magnetically coupled to first inductor 110 and third inductor 850 than to second inductor 112. Neighbor magnetic coupling can be more generally described in the case of N inductors that are mutually magnetically coupled but with inductor i being more strongly magnetically coupled to inductors i−1 and i+1 than to the other inductors, where i=(1, 2, . . . N), with exceptions for i=1 and for i=N. In the case of i=1, inductor i is more strongly magnetically coupled to inductor N and inductor 2 than to the other inductors, and in the case of i=N, inductor i is more strongly magnetically coupled to inductor N−1 and inductor 1 than to the other inductors. The curves representing current 208 through leakage inductance of second inductor 112 and current 866 through leakage inductance of fourth inductor 854 are essentially the same and are therefore represented as a single dashed line in FIG. 10 to promote illustrative clarity Controller 818 is configured to control each of first switching circuit 106, second switching circuit 108, third switching circuit 848, and fourth switching circuit 852 in DCM, as described below and as illustrated in FIG. 10, in the alternate embodiment of FIGS. 10 and 11. During a first sub-period 1014 of period T, first switching circuit 106 forward biases first inductor 110, and second, third, and fourth switching circuits 108, 848, and 852 reverse bias second inductor 112, third inductor 850, and fourth inductor 854, respectively, such that current 206 through first inductor 110 ramps up and magnetically induces current through each of second, third, and fourth inductors 112, 850, 854. Each switching circuit 106, 108, 848, 852 reverse biases it respective inductor 110, 112, 850, 854 in a second sub-period 1016 of period T, such that current through each inductor ramps down.

In response to magnitude of current 864 through third inductor 850 falling to zero, third switching circuit 848 forward biases third inductor 850 in a third sub-period 1018 of period T. As a result, magnitude of current through third inductor 850 ramps up and magnetically induces current each other inductor 110, 112, 854. Each switching circuit 106, 108, 848, 852 then reverse biases it respective inductor 110, 112, 850, 854 in a fourth sub-period 1020 of period T, such that current through each inductor ramps down. In a fifth sub-period 1022 of period T, each of second switching circuit 108 and fourth switching circuit 852 forward biases second inductor 112 and fourth inductor 854, respectively, such that current through second inductor 112 and fourth inductor 854 ramps up and magnetically induces current through first inductor 110 and third inductor 850. Thus, first inductor 110, second inductor 112, and third inductor 850 are forward biased non-simultaneously during each DCM switching period T, and first inductor 110, third inductor 850, and fourth inductor 854 are also forward biased non-simultaneously during each DCM switching period T. In a sixth sub-period 1024 of period T, each switching circuit 106, 108, 848, 852 reverse biases it respective inductor 110, 112, 850, 854, such that current through each inductor ramps down. In a seventh sub-period 1026 of period T, each switching circuit 106, 108, 848, 852 operates in a high-impedance state to electrically isolate its respective inductor 110, 114, 850, 854, such that magnitude of current through each inductor remains at zero for the duration of seventh sub-period 1026. In some alternate embodiments, third sub-period 1018 and/or fifth sub-period 1022 begin at a different time than that illustrated in FIG. 10, as long as third sub-period 1018 and fifth sub-period 1022 begin while current is still flowing through at least one of inductors 110, 112, 850, and 854 after reverse biasing first inductor 110.

Figure 12:
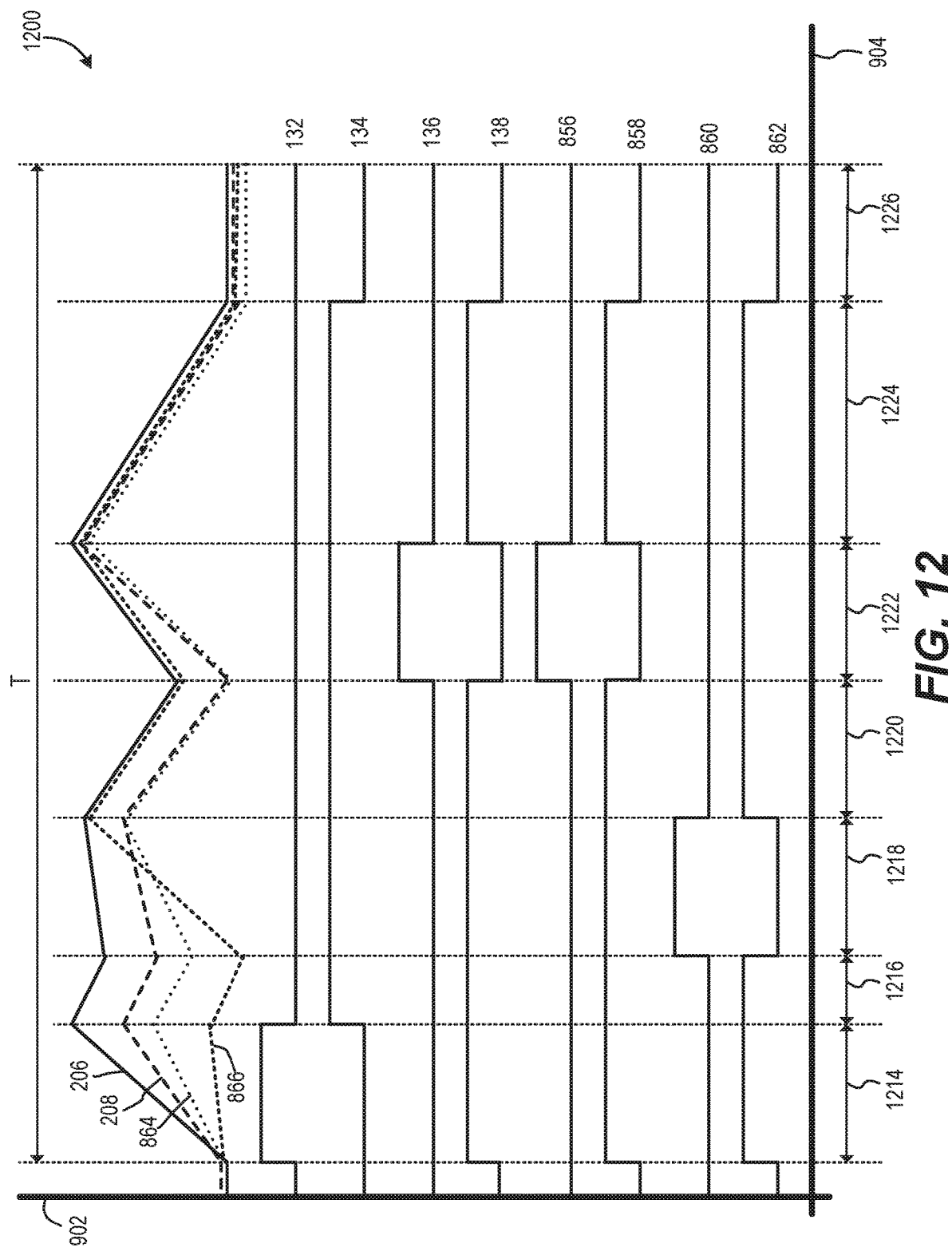
FIG. 12 illustrates DCM of another alternate embodiment of the FIG. 8 DC-to-DC converter.

FIG. 12 includes a graph 1200 like that of FIG. 9 but illustrating DCM of another alternate embodiment of DC-to-DC converter 800 with different magnetic coupling of inductors 110, 112, 850, 854. In particular, inductors 110, 112, 850, 854 have a "ladder" magnetic coupling configuration, as symbolically illustrated in FIG. 13 where arrows 1302 represent strong magnetic coupling, in the FIG. 12 alternate embodiment. Ladder magnetic coupling can be more generally described in the case of N inductors as all inductors being magnetically coupled but with inductor j being more strongly magnetically coupled to inductors j−1 and j+1 than to the other inductors, where i=(1, 2, . . . N), with exceptions for cases where j=1 and where j=N. In the case of j=1, inductor j is more strongly magnetically coupled to inductor 2 than to the other inductors, and in the case of j=N, inductor j is more strongly magnetically coupled to inductor N−1 than to the other inductors.

Figure 13:
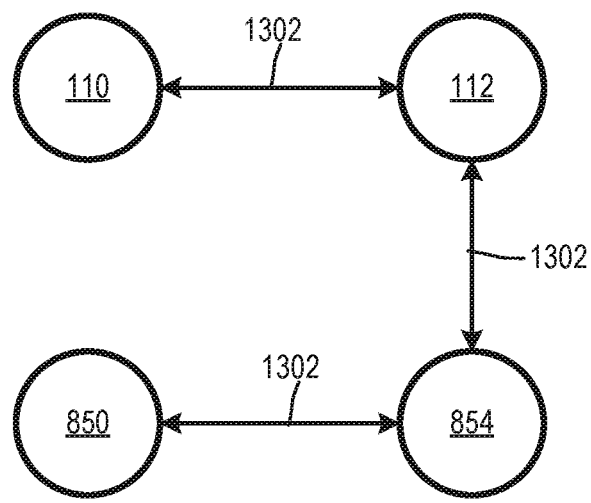
FIG. 13 illustrates magnetic coupling of the alternate embodiment of FIG. 12.

Controller 818 is configured to control each of first switching circuit 106, second switching circuit 108, third switching circuit 848, and fourth switching circuit 852 in DCM, as described below and as illustrated in FIG. 12, in the alternate embodiment of FIGS. 12 and 13. During a first sub-period 1214 of period T, first switching circuit 106 forward biases first inductor 110, and second, third, and fourth switching circuits 108, 848, and 852 reverse bias second inductor 112, third inductor 850, and fourth inductor 854, respectively, such that current 206 through first inductor 110 ramps up and magnetically induces current through each of second, third, and fourth inductors 112, 850, 854. Each switching circuit 106, 108, 848, 852 reverse biases it respective inductor 110, 112, 850, 854 in a second sub-period 1216 of period T, such that current through each inductor ramps down.

In response to magnitude of current through fourth inductor 854 falling to zero, fourth switching circuit 852 forward biases fourth inductor 854 in a third sub-period 1218 of period T. As a result, magnitude of current through fourth inductor 854 ramps up and magnetically induces current through each other inductor 110, 112, 850. Each switching circuit 106, 108, 848, 852 then reverse biases it respective inductor 110, 112, 850, 854 in a fourth sub-period 1220 of period T, such that current through each inductor ramps down. In a fifth sub-period 1222 of period T, each of second switching circuit 108 and third switching circuit 848 forward biases second inductor 112 and third inductor 850, respectively, such that current through second inductor 112 and current through third inductor 850 ramps up and magnetically induces current through first inductor 110 and fourth inductor 854. Thus, first inductor 110, second inductor 112, and fourth inductor 854 are forward biased non-simultaneously during each DCM switching period T, and first inductor 110, third inductor 850, and fourth inductor 854 are also forward biased non-simultaneously during each DCM switching period T. In a sixth sub-period 1224 of period T, each switching circuit 106, 108, 848, 852 reverse biases it respective inductor 110, 112, 850, 854, such that current through each inductor ramps down. In a seventh sub-period 1226 of period T, each switching circuit 106, 108, 848, 852 operates in a high-impedance state to electrically isolate its respective inductor 110, 114, 850, 854, such that magnitude of current through each inductor remains at zero for the duration of seventh sub-period 1226. In some alternate embodiments, third sub-period 1218 and/or fifth sub-period 1222 begin at a different time than that illustrated in FIG. 12, as long as third sub-period 1218 and fifth sub-period 1222 begin while current is still flowing through at least one of inductors 110, 112, 850, and 854 after reverse biasing first inductor 110.

While DC-to-DC converter 800 illustrated herein as having four phases 122, DC-to-DC converter 800 could be modified to have a different number of phases 122 with appropriate changes to its switching patterns, as long as at least two energy transfer pulses occur in each period during DCM. Thus, DC-to-DC converter 800 can be more generally described as having N phases with mutual, neighbor or ladder magnetic coupling of inductors of the phase, where N is an integer greater than two, and at least two energy transfer pulses occur in each period during DCM. Additionally, although each of DC-to-DC converters 200 and 800 is illustrated as being a multi-phase buck converter, either DC-to-DC converter could be modified to have a different topology, such as a boost topology or a buck-boost topology, without departing from the scope hereof.

Figure 14:
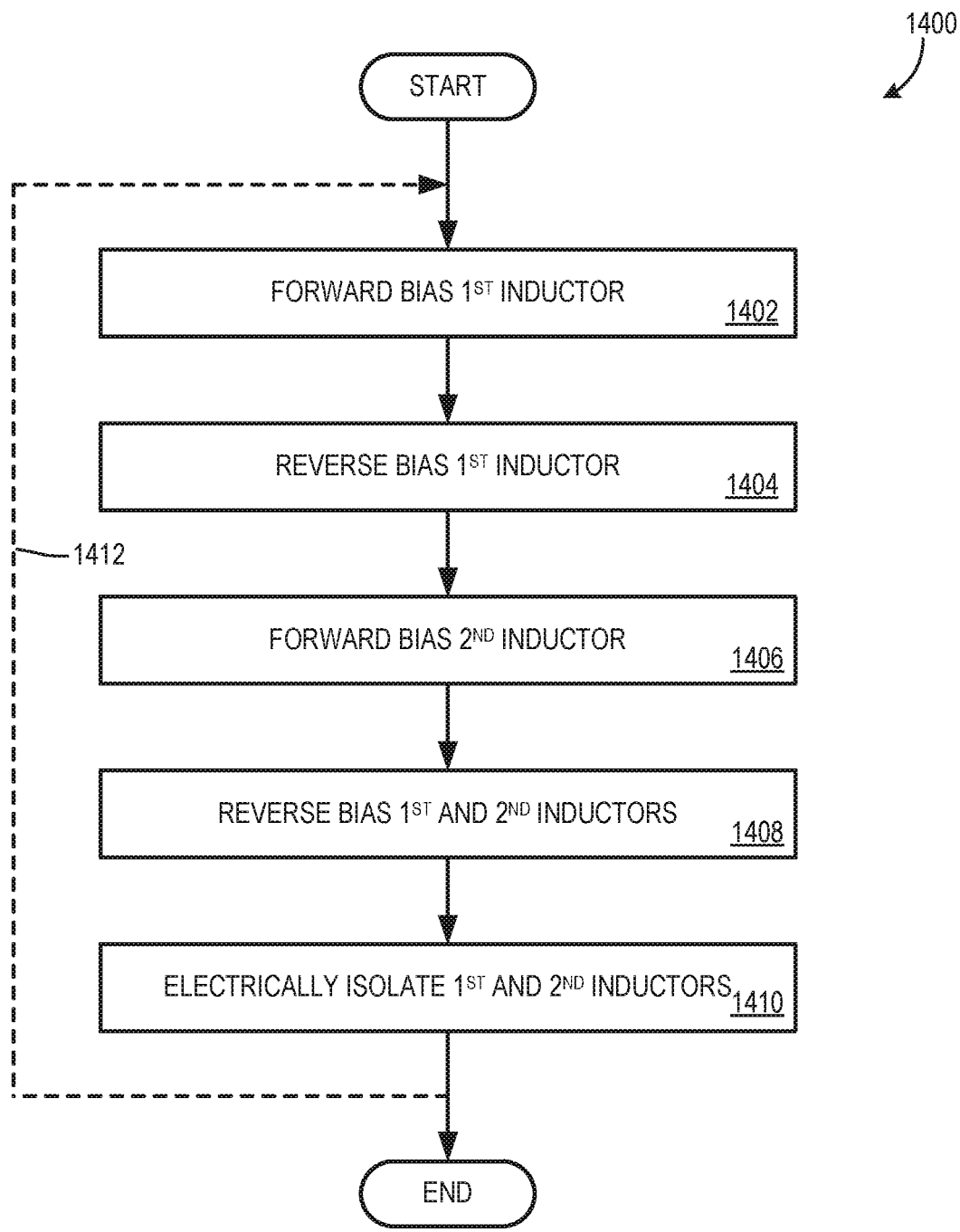
FIG. 14 illustrates a method for discontinuous conduction mode operation of a multi-phase DC-to-DC converter, according to an embodiment.

FIG. 14 illustrates a method 1400 for discontinuous conduction mode operation of a multi-phase DC-to-DC converter. Method 1400 begins with a step 1402 of forward biasing a first inductor magnetically coupled to a second inductor such that current through the first inductor ramps up and magnetically induces current through the second inductor. In one example of step 1402, first switching circuit 106 forward biases first inductor 110, and second switching circuit 108 reverse biases second inductor 112, such that current 206 through first inductor 110 ramps up and magnetically induces current 208 through second inductor 112, as illustrated in FIG. 3. In step 1404, the first inductor is reverse biased after forward biasing the first inductor. In one example of step 1404, first switching circuit 106 reverse biases first inductor 110 while second switching circuit 108 reverse biases second inductor 112.

Step 1404 proceeds to step 1406 where the second inductor is forward biased such that current through the second inductor ramps up and magnetically induces current through the first inductor, while reverse biasing the first inductor and before magnitude of current through the first inductor falls to zero. In one example of step 1406, second switching circuit 108 forward biases second inductor 112 while first switching circuit 106 reverse biases first inductor 110, such that magnitude of current 208 through second inductor 112 ramps up and magnetically induces current through first inductor 110. In step 1408, each of the first and second inductors is reversed biased such that magnitude of current through each of the first and second inductors ramps down to zero. In one example of step 1408, first switching circuit 106 reverse biases first inductor 110, and second switching circuit 108 reverse biases second inductor 112, such that current 206 through first inductor 110 and current 208 through second inductor 112 ramp down.

In step 1410, each of the first and second inductors is electrically isolated such that magnitude of current through each of the first and second inductors remains at zero for a finite amount of time. In one example of step 1410, each of first switching circuit 106 and second switching circuit 108 operates in a high-impedance state to electrically isolate its respective inductor 110, 112, such that magnitude of current 206 through first inductor 110 and magnitude of current 208 through second inductor 112 each remain at zero. Steps 1402 through 1410 optionally repeat one or more times as indicated by arrow 1412.

Combinations of Features

Features described above may be combined in various ways without departing from the scope hereof. The following examples illustrate some possible combinations:

(A1) A method for discontinuous conduction mode operation of a multi-phase DC-to-DC converter may include the steps of (1) forward biasing a first inductor being magnetically coupled to a second inductor such that a magnitude of current through the first inductor ramps up, (2) reverse biasing the first inductor after forward biasing the first inductor, and (3) while reverse biasing the first inductor and before the magnitude of current through the first inductor falls to zero, forward biasing the second inductor such that a magnitude of current through the second inductor ramps up.

(A2) The method denoted as (A1) may further include, after the step of forward biasing the second inductor, reverse biasing each of the first and second inductors such that the magnitude of the current through the first inductor and the magnitude of the current through the second inductor ramps down towards zero.

(A3) The method denoted as (A2) may further include, after the step of reverse biasing each of the first and second inductors, electrically isolating each of the first and second inductors such that the magnitude of current through the first inductor and the magnitude of current through the second inductor remains substantially at zero for a finite amount of time.

(A4) Any of the methods denoted as (A1) through (A3) may further include (1) designating one inductor of a plurality of inductors of the multi-phase DC-to-DC converter as the first inductor in each switching period of the multi-phase DC-to-DC converter and (2) changing which inductor of the plurality of inductors is designated as the first inductor between successive switching periods of the multi-phase DC-to-DC converter.

(A5) In any one of the methods denoted as (A1) through (A4), the DC-to-DC converter may include at least one additional inductor magnetically coupled to each of the first and second inductors, and the step of forward biasing the second inductor may include forwarding biasing the second inductor while current is still flowing through at least one of the first inductor, the second inductor, and the at least one additional inductor, after the step of forward biasing the first inductor.

(A6) Any one of the methods denoted as (A1) through (A4) may further include (1) forward biasing a third inductor while forward biasing the second inductor, where the third inductor is magnetically coupled to each of the first and second inductors and the third inductor is more strongly magnetically coupled to the second inductor than to the first inductor, and (2) while reverse biasing the first inductor but before forward biasing the second and third inductors, forward biasing a fourth inductor, wherein the fourth inductor is magnetically coupled to each of the first, second, and third inductors and the fourth inductor is more strongly magnetically coupled to the third inductor than to each of the first and second inductors, such that a magnitude of current flowing through the fourth inductor ramps up.

(A7) Any one of the methods denoted as (A1) through (A6) may further include forward biasing the second inductor in response to the magnitude of current through the second inductor falling to zero.

(A8) Any one of the methods denoted as (A1) through (A6) may further include forward biasing the second inductor in response to the first inductor being reverse biased.

(A9) Any one of methods denoted as (A1) through (A8) may further include summing current through each of the first and second inductors at a common node.

(A10) The method denoted as (A9) may further include capacitively filtering the common node.

(B1) A method for discontinuous conduction mode operation of a multi-phase DC-to-DC converter including a plurality of magnetically coupled inductors may include forward biasing at least two of the plurality of magnetically coupled inductors non-simultaneously during each switching period, during discontinuous conduction mode operation of the multi-phase DC-to-DC converter.

(C1) A multi-phase DC-to-DC converter being configured to operate in at least a discontinuous conduction mode may include (1) a first inductor magnetically coupled to a second inductor, (2) a first switching circuit electrically connected to the first inductor, (3) a second switching circuit electrically connected to the second inductor, and (4) a controller being configured to (i) cause the first switching circuit to forward bias the first inductor such that a magnitude of current through the first inductor ramps up, (ii) cause the first switching circuit to reverse bias the first inductor after forward biasing the first inductor, and (iii) cause the second switching circuit to forward bias the second inductor such that a magnitude of current through the second inductor ramps up, while causing the first switching circuit to reverse bias the first inductor but before the magnitude of current through the first inductor falls to zero.

(C2) In the multi-phase DC-to-DC converter denoted as (C1), the controller may be further configured to cause the first and second switching circuits to reverse bias the first and second inductors, respectively, such that the magnitude of current through the first inductor and the magnitude of current through the second inductor fall to zero.

(C3) In the multi-phase DC-to-DC converter denoted as (C2), the controller may be further configured to cause the first and second switching circuits to electrically isolate the first and second inductors, respectively, such that the magnitude of current through the first inductor and the magnitude of current through the second inductor remain at zero for a finite amount of time.

(C4) Any one of the multi-phase DC-to-DC converters denoted as (C1) through (C3) may further include at least one additional inductor being magnetically coupled to at least one of the first inductor and the second inductor.

(C5) Any one of the multi-phase DC-to-DC converters denoted as (C1) through (C4) may further include (1) a third inductor magnetically coupled to each of the first and second inductors, (2) a fourth inductor magnetically coupled to each of the first, second, and third inductors, (3) a third switching circuit electrically connected to the third inductor, and (4) a fourth switching circuit electrically connected to the fourth inductor, where the controller is further configured to (i) cause the third switching circuit to forward bias the third inductor while causing the second switching circuit to forward bias the second inductor, such that a magnitude of current through the third inductor magnetically induces current through the first inductor, and (ii) cause the fourth switching circuit to forward bias the fourth inductor while causing the second switching circuit to forward bias the second inductor, such that current through the fourth inductor magnetically induces current through the first inductor.

(C6) Any one of the multi-phase DC-to-DC converters denoted as (C1) through (C4) may further include (1) a third inductor magnetically coupled to each of the first and second inductors, wherein the third inductor is more strongly magnetically coupled to the second inductor than to the first inductor, (2) a fourth inductor magnetically coupled to each of the first, second, and third inductors, where the fourth inductor is more strongly magnetically coupled to each of the first and third inductors than to the second inductor, (3) a third switching circuit electrically connected to the third inductor, and (4) a fourth switching circuit electrically connected to the fourth inductor, where the controller is further configured to (i) cause the third switching circuit to forward bias the third inductor, while causing the first switching circuit to reverse bias the first inductor but before causing the second switching circuit to forward bias the second inductor, and (ii) cause the fourth switching circuit to forward bias the fourth inductor while causing the second switching circuit to forward bias the second inductor.

(C7) Any one of the multi-phase DC-to-DC converters denoted as (C1) through (C4) may further include (1) a third inductor magnetically coupled to each of the first and second inductors, where the third inductor is more strongly magnetically coupled to the second inductor than to the first inductor, (2) a fourth inductor magnetically coupled to each of the first, second, and third inductors, wherein the fourth inductor is more strongly magnetically coupled to the third inductor than to each of the first and second inductors, (3) a third switching circuit electrically connected to the third inductor, (4) a fourth switching circuit electrically connected to the fourth inductor, and where the controller is further configured to (i) cause the third switching circuit to forward bias the third inductor while causing the second switching circuit to forward bias the second inductor, and (ii) cause the fourth switching circuit to forward bias the fourth inductor, while causing the first switching circuit to forward bias the first inductor but before causing the second switching circuit to forward bias the second inductor.

(C8) In any one of the multi-phase DC-to-DC converters denoted as (C1) thorough (C7), the controller may be further configured to cause the second switching circuit to forward bias the second inductor in response to the magnitude of current through the second inductor falling to zero.

(C9) In any one of the multi-phase DC-to-DC converters denoted as (C1) through (C7), the controller may be further configured to cause the second switching circuit to forward bias the second inductor in response to the first inductor being reverse biased.

(C10) In any one of the multi-phase DC-to-DC converters denoted as (C1) through (C9), the multiphase DC-to-DC converter may have a topology selected from the group consisting of a buck converter, a boost converter, and a buck-boost converter.

(D1) A multi-phase DC-to-DC converter may include (1) a plurality of magnetically coupled inductors, (2) a respective switching circuit electrically connected to each of the plurality of inductors, and (3) a controller configured to control the respective switching circuits electrically connected to each of the plurality of inductors such that at least two of the plurality of inductors are forward biased non-simultaneously during each switching period, during discontinuous conduction mode operation of the multi-phase DC-to-DC converter.

Changes may be made in the above DC-to-DC converters and associated methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for discontinuous conduction mode operation of a multi-phase DC-to-DC converter, comprising the steps of:
   electrically isolating each of a first inductor and a second inductor such that a magnitude of current through the first inductor and a magnitude of current through the second inductor remains at zero for a finite amount of time, the first inductor being magnetically coupled to the second inductor;
   after electrically isolating each of the first inductor and the second inductor, forward biasing the first inductor such that the magnitude of current through the first inductor ramps up from zero and the magnitude of current through the second inductor ramps up from zero; and
   before the magnitude of current through the first inductor falls to zero after forward biasing the first inductor:
      reverse biasing the first inductor, and
      while reverse biasing the first inductor, forward biasing the second inductor such that the magnitude of current through the second inductor ramps up and the magnitude of current through the first inductor ramps up.

2. The method of claim 1, further comprising, after the step of forward biasing the second inductor, simultaneously reverse biasing each of the first and second inductors such that the magnitude of the current through the first inductor and the magnitude of the current through the second inductor ramps down towards zero.

3. The method of claim 2, further comprising, after the step of reverse biasing each of the first and second inductors, electrically isolating each of the first and second inductors such that the magnitude of current through the first inductor and the magnitude of current through the second inductor remains substantially at zero for a finite amount of time.

4. The method of claim 1, wherein:
   the DC-to-DC converter comprises at least one additional inductor magnetically coupled to each of the first and second inductors; and
   the step of forward biasing the second inductor comprises forwarding biasing the second inductor while current is still flowing through at least one of the first inductor, the second inductor, and the at least one additional inductor, after the step of forward biasing the first inductor.

5. The method of claim 1, further comprising:
   forward biasing a third inductor while forward biasing the second inductor, wherein the third inductor is magnetically coupled to each of the first and second inductors and the third inductor is more strongly magnetically coupled to the second inductor than to the first inductor; and
   while reverse biasing the first inductor but before forward biasing the second and third inductors, forward biasing a fourth inductor, wherein the fourth inductor is magnetically coupled to each of the first, second, and third inductors and the fourth inductor is more strongly magnetically coupled to the third inductor than to each of the first and second inductors, such that a magnitude of current flowing through the fourth inductor ramps up.

6. The method of claim 1, further comprising forward biasing the second inductor in response to the magnitude of current through the second inductor falling to zero.

7. The method of claim 1, further comprising forward biasing the second inductor in response to the first inductor being reverse biased.

8. The method of claim 1, further comprising summing current through each of the first and second inductors at a common node.

9. The method of claim 8, further comprising capacitively filtering the common node.

10. A method for discontinuous conduction mode operation of a multi-phase DC-to-DC converter including a plurality of magnetically coupled inductors, comprising forward biasing at least two of the plurality of magnetically coupled inductors non-simultaneously during a first continuous time period where a magnitude of current through at least one of the plurality of magnetically coupled inductors remains at a non-zero value, after magnitude of current through each of the plurality of magnetically couple inductors remains at zero for a finite amount of time, during discontinuous conduction mode operation of the multi-phase DC-to-DC converter.

11. A multi-phase DC-to-DC converter being configured to operate in at least a discontinuous conduction mode, comprising:
   a first inductor magnetically coupled to a second inductor;
   a first switching circuit electrically connected to the first inductor;
   a second switching circuit electrically connected to the second inductor; and
   a controller being configured to:
      cause the first and second switching circuits to electrically isolate the first and second inductors, respectively, such that a magnitude of current through the first inductor and a magnitude of current through the second inductor remain at zero for a finite amount of time,
      after causing the first and second switching circuits to electrically isolate the first and second inductors, respectively, cause the first switching circuit to forward bias the first inductor such that the magnitude of current through the first inductor ramps up from zero and the magnitude of current through the second inductor ramps up from zero, and
      before the magnitude of current through the first inductor falls to zero after forward biasing the first inductor:
         cause the first switching circuit to reverse bias the first inductor after forward biasing the first inductor, and
         cause the second switching circuit to forward bias the second inductor such that the magnitude of current through the second inductor ramps up and the magnitude of current through the first inductor ramps up, while causing the first switching circuit to reverse bias the first inductor.

12. The multi-phase DC-to-DC converter of claim 11, wherein the controller is further configured to cause the first and second switching circuits to simultaneously reverse bias the first and second inductors, respectively, such that the magnitude of current through the first inductor and the magnitude of current through the second inductor fall to zero.

13. The multi-phase DC-to-DC converter of claim 11, further comprising at least one additional inductor being magnetically coupled to at least one of the first inductor and the second inductor.

14. The multi-phase DC-to-DC converter of claim 11, further comprising:

a third inductor magnetically coupled to each of the first and second inductors;

a fourth inductor magnetically coupled to each of the first, second, and third inductors;

a third switching circuit electrically connected to the third inductor; and a fourth switching circuit electrically connected to the fourth inductor;

wherein the controller is further configured to:
  cause the third switching circuit to forward bias the third inductor while causing the second switching circuit to forward bias the second inductor, such that a magnitude of current through the third inductor magnetically induces current through the first inductor, and
  cause the fourth switching circuit to forward bias the fourth inductor while causing the second switching circuit to forward bias the second inductor, such that current through the fourth inductor magnetically induces current through the first inductor.

15. The multi-phase DC-to-DC converter of claim 11, further comprising:

a third inductor magnetically coupled to each of the first and second inductors, wherein the third inductor is more strongly magnetically coupled to the second inductor than to the first inductor;

a fourth inductor magnetically coupled to each of the first, second, and third inductors, wherein the fourth inductor is more strongly magnetically coupled to each of the first and third inductors than to the second inductor;

a third switching circuit electrically connected to the third inductor; and a fourth switching circuit electrically connected to the fourth inductor;

wherein the controller is further configured to:
  cause the third switching circuit to forward bias the third inductor, while causing the first switching circuit to reverse bias the first inductor but before causing the second switching circuit to forward bias the second inductor, and
  cause the fourth switching circuit to forward bias the fourth inductor while causing the second switching circuit to forward bias the second inductor.

16. The multi-phase DC-to-DC converter of claim 11, further comprising:

a third inductor magnetically coupled to each of the first and second inductors, wherein the third inductor is more strongly magnetically coupled to the second inductor than to the first inductor;

a fourth inductor magnetically coupled to each of the first, second, and third inductors, wherein the fourth inductor is more strongly magnetically coupled to the third inductor than to each of the first and second inductors;

a third switching circuit electrically connected to the third inductor;

a fourth switching circuit electrically connected to the fourth inductor; and wherein the controller is further configured to:
  cause the third switching circuit to forward bias the third inductor while causing the second switching circuit to forward bias the second inductor, and
  cause the fourth switching circuit to forward bias the fourth inductor, while causing the first switching circuit to forward bias the first inductor but before causing the second switching circuit to forward bias the second inductor.

17. The multi-phase DC-to-DC converter of claim 11, wherein the controller is further configured to cause the second switching circuit to forward bias the second inductor in response to the magnitude of current through the second inductor falling to zero.

18. The multi-phase DC-to-DC converter of claim 11, wherein the controller is further configured to cause the second switching circuit to forward bias the second inductor in response to the first inductor being reverse biased.

19. The multi-phase DC-to-DC converter of claim 11, the multiphase DC-to-DC converter having a topology selected from the group consisting of a buck converter, a boost converter, and a buck-boost converter.

20. A multi-phase DC-to-DC converter, comprising:
a plurality of magnetically coupled inductors;
a respective switching circuit electrically connected to each of the plurality of magnetically couple inductors; and
a controller configured to control the respective switching circuits electrically connected to each of the plurality of magnetically coupled inductors such that at least two of the plurality of magnetically coupled inductors are forward biased non-simultaneously during a first continuous time period where a magnitude of current through at least one of the plurality of magnetically coupled inductors remains at a non-zero value, after magnitude of current through each of the plurality magnetically couple inductors remains at zero for a finite amount of time, during discontinuous conduction mode operation of the multi-phase DC-to-DC converter.

* * * * *